Sept. 2, 1947.  W. L. SHAFFER  2,426,711
ANTIHUNT ELECTRICAL SERVOMOTOR SYSTEM
Filed Dec. 19, 1942  2 Sheets-Sheet 1

INVENTOR.
WILLIAM L. SHAFFER.
BY C. B. Spangenberg
ATTORNEY.

INVENTOR.
WILLIAM L. SHAFFER.

Patented Sept. 2, 1947

2,426,711

UNITED STATES PATENT OFFICE 2,426,711

ANTIHUNT ELECTRICAL SERVOMOTOR SYSTEM

William L. Shaffer, Philadelphia, Pa., assignor to The Brown Instrument Company, Philadelphia, Pa., a corporation of Pennsylvania Application December 19, 1942, Serial No. 469,533

6 Claims. (Cl. 172—239)

The present invention relates to electrical apparatus of the self-balancing type for ascertaining the magnitude or changes in magnitude of a variable condition such as temperature, pressure, flow, liquid level, etc. and including suitable provisions for indicating or making a record of the changes and/or maintaining the condition at a predetermined value.

A general object of the invention is to provide improved anti-hunting means in such indicating, recording and/or controlling apparatus.

A more specific object of the invention is to provide improved stationary anti-hunting means in such apparatus.

The provision of suitable anti-hunting means in self-balancing recording and/or controlling systems is desirable since the inertia of the various mechanically connected parts comprising the driving structure tends to so operate as to effect a rebalancing adjustment beyond the proper position of rebalance. When such a condition of overshooting prevails, the system then becomes unbalanced in the opposite direction and initiates operation of the driving structure in the reverse direction to effect rebalance, but again the necessary regulation is exceeded to thereby set up a continuous hunting of the driving structure about the balance point.

The need for eliminating hunting in measuring and controlling apparatus has long been recognized and various arrangements have been proposed to attain this end. Thus, according to one prior art arrangement this result is accomplished by operating the rebalancing driving structure in accordance with the extent of unbalance of the system, and by providing mechanically moving means for anticipating the approach of the driving structure to the true balance position. In another prior art arrangement means are provided in the form of a generator actuated by the driving structure for obtaining an electromotive force proportional to the speed of operation of the driving structure. This electromotive force is introduced into the measuring or detector circuit in opposition to the unbalanced electromotive force of the condition responsive network and operates to produce a condition of simulated rebalance of the network before the latter is actually rebalanced to thereby anticipate the true balance position of the network.

It is a specific object of the present invention to provide new and improved anti-hunting means for use in measuring and controlling apparatus in which an electromotive force proportional to the extent of unbalance of the condition responsive network is obtained without requiring the use of any physically movable means additional to the rebalancing structure, and in which simple and efficient means under control of the derived electromotive force are provided to anticipate the approach of the driving structure to the balance point and thus neutralize the tendency of the system to hunt.

A further and more specific object of the invention is to provide in self-balancing measuring and/or controlling apparatus, utilizing electronic amplifier means, a variable-mu tube the amplification factor of which is varied under control of the derived electromotive force to minimize hunting of the apparatus.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 1:
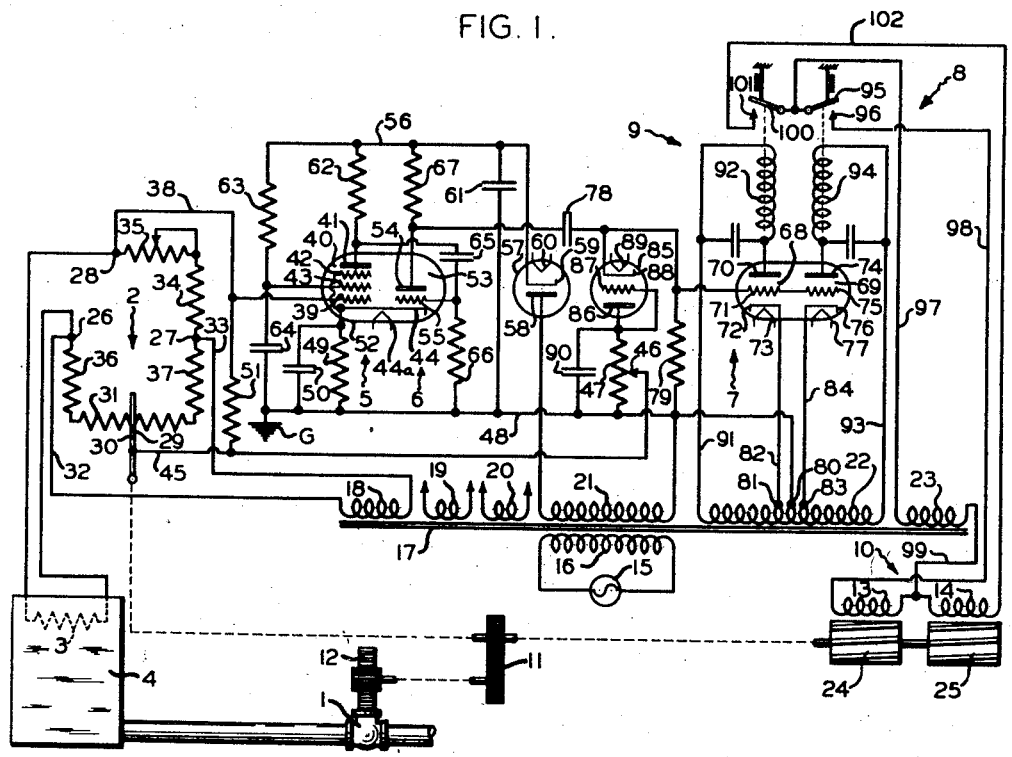
Fig. 1 is a diagrammatic representation of the use of one embodiment of my invention in a temperature control system in which an electrical bridge network is utilized to detect the temperature variations.

Referring to Fig. 1, my invention is shown, by way of example, as applied to a control system wherein the position of a valve 1 is modulated in accordance with the balance or unbalance of a bridge network 2 which includes a temperature responsive resistance 3 in one arm. The temperature responsive resistance 3 is disposed in a room or space 4 which is heated by a furnace supplied with fuel through valve 1. The unbalanced potential of the bridge network 2 is applied to the input circuit of an electronic amplifier having two preliminary amplifying stages 5 and 6 and an output stage 7. A pair of relays 8 and 9 are selectively operated by the output stage 7 to control the rotation and direction of rotation of reversible electrical motor 10. The valve 1 is actuated through a gear train 11 and a rack 12 by motor 10. Motor 10 is provided with a pair of windings 13 and 14 whose selective energization causes rotation of the motor in one direction or the other. Electric power is supplied to the system from a suitable source of alternating current which has been designated by the reference character 15 and to which is connected the primary winding 16 of a transformer 17. Transformer 17 has a plurality of secondary windings 18, 19, 20, 21, 22 and 23. Winding 18 supplies power to the bridge network 2, windings 19, 20, 21 and 22 supply power to the amplifying stages, and winding 23 supplies power to the motor windings 13 and 14.

The motor 10 is of the conventional induction type and is provided with two rotors 24 and 25 which are axially displaced on the motor shaft. Field winding 13 is individual to the rotor 24 and field winding 14 is individual to the rotor 25. When the motor is operating with the field winding 13 energized, the direction of rotation is such as to increase the opening of the valve 1 and thereby to raise the temperature of the space 4. Conversely, the field winding 14 when energized produces opposite rotation so as to reduce the valve opening and lower the temperature of space 4.

The bridge network 2 has a pair of input terminals 26 and 27 and a pair of output terminals 28 and 29. Output terminal 29 is the point of engagement of a slider contact arm 30 on a slidewire resistance 31. Input terminals 26 and 27 are connected to the terminals of the transformer secondary winding 18 by means of conductors 32 and 33.

Bridge network 2 includes the temperature responsive resistance 3 in the upper left arm and includes a fixed resistance 34 and a variable resistance 35 in the upper right arm. The lower left arm includes a fixed resistance 36 and a portion of the slidewire resistance 31 depending upon the position of the slider contact arm 30. The lower right arm includes a fixed resistance 37 and the remaining portion of the slidewire resistance 31. The adjustable resistance 35 is provided so that the position of valve 1 to be maintained in response to a given temperature adjacent resistance 3 may be manually determined.

Output terminal 28 of bridge network 2 is connected by means of a conductor 38 to the control electrode 39 of a variable-mu pentode 40 which also includes an anode 41, a suppressor grid 42, a screen grid 43 and a cathode 44 and forms a part of the first preliminary stage 5 of the electronic amplifier. The other output terminal 29 of bridge network 2 is connected to the cathode 44 of pentode 40 through a circuit which may be traced from the terminal 29 through slide contact arm 30, a conductor 45, a contact 46 which is in engagement with a slidewire resistance 47, a conductor 48, and a biasing resistance 49 which is shunted by a condenser 50 to the cathode 44 of pentode 40. The conductor 48 is connected to ground as indicated at G. A resistance 51 of suitable value is connected between the bridge network output terminals 28 and 29.

Pentode 40 comprises part of a triode pentode tube 52 which may be of the type sold commercially as the type 6F7. Tube 52 includes a triode 53 in addition to the pentode 40, which triode forms a part of the second preliminary stage 6 of the amplifier. The cathode 44 is common to the pentode 40 and triode 53. Triode 53 also includes an anode 54, and a control grid 55. A heater filament 44a which has its terminals connected to the transformer secondary winding 19 is provided for heating the cathode 44.

The grounded conductor 48 forms the negative terminal of the power supply for the two preliminary amplifying stages 5 and 6. Conductor 56 forms the positive terminal of the power supply for these stages. A unidirectional potential is supplied between conductors 56 and 48 by means of a rectifier circuit connected to the transformer secondary winding 21. This rectifier circuit includes a diode 57 having an anode 58, a cathode 59 and a heater filament 60. Energizing current is supplied to the heater filament 60 from the transformer secondary winding 20.

The rectifier circuit may be traced from the left end terminal of transformer secondary winding 21 to the anode 58 of diode 57, and the cathode 59 to the positive terminal of a filter condenser 61, to which terminal conductor 56 is also connected. The other and negative terminal of condenser 61 is connected to the grounded conductor 48 and therethrough to the right end terminal of the transformer secondary winding 21. Thus, conductor 56 is connected to the positive terminal of condenser 61 and conductor 48 is connected to the negative terminal of condenser 61.

The output circuit of the first preliminary amplifying stage 5 may be traced from the positive conductor 56 through a load resistor 62, anode 41, cathode 44, and the parallel connected resistance 49 and condenser 50 to the grounded negative conductor 48. The suppressor grid 42 and the cathode 44 of pentode 40 are internally connected. Screen grid voltage is obtained for pentode 40 by connecting the screen grid through a resistor 63 to the positive conductor 56 and by connecting the screen grid through a condenser 64 to the grounded negative conductor 48.

The output circuit of preliminary amplifying stage 5 is coupled to the input circuit of the second preliminary amplifying stage 6 by a condenser 65 one terminal of which is connected by a conductor to the anode 41 and the other terminal of which is connected to control grid 55 of triode 53. Control grid 55 is also connected through a resistance 66 to the negative conductor 48 and through the parallel connected elements 49 and 50 to the cathode 44. The condenser 65 operates to transmit any alternating or fluctuating potential appearing in the output circuit of stage 5 to the input circuit of stage 6 while simultaneously blocking the transmission of any direct current potential from the output circuit of stage 5 to the input circuit of stage 6.

The output circuit of preliminary amplifying stage 6 may be traced from the positive conductor 56 through a load resistor 67, anode 54, cathode 44, and parallel connected resistance 49 and condenser 50 to the negative conductor 48, and is coupled to the input circuits of the amplifier output stage 7.

Output stage 7 includes a pair of triodes 68 and 69 which may be contained within the same bulb, as shown. Triode 68 includes an anode 70, a control grid 71, a cathode 72 and a heater filament 73. Similarly, triode 69 includes an anode 74, a control grid 75, a cathode 76 and a heater filament 77. Heater filaments 73 and 77 have their terminals connected to the terminals of the transformer secondary winding 19 and receive energizing current from the latter winding.

The input circuits of triodes 68 and 69 of stage 7 are connected in parallel and are coupled by a condenser 78 and a resistance 79 to the output circuit of the preliminary amplifying stage 6. To this end one terminal of condenser 78 is connected to the anode 54 of triode 53 and the other terminal of condenser 78 is connected to the control grids 71 and 75 of triodes 68 and 69, which, as shown, are connected together. The control grids 71 and 75 are connected by the resistance 79 to the grounded negative conductor 48 which, in turn is connected to a center tap 80 provided on the transformer secondary winding 22. A tap 81 on the winding 22 to the left of center tap 80 is connected by a conductor 82 to the left cathode 72 of triode 68, and a tap 83 on the winding 22 to the right of center tap 80 is connected by a conductor 84 to the cathode 76. The alternating potential produced between the taps 80 and 81 serves to bias the control grid 71 of triode 68 negatively with respect to the cathode 72 while the alternating potential produced between the taps 80 and 83 operates to bias the control grid 75 of triode 69 negatively with respect to the cathode 76.

The output circuit of preliminary amplifying stage 6 is also coupled by means of condenser 78 to the resistance 47 previously referred to as having at least a portion thereof included in the input circuit of pentode 40. This coupling circuit includes a triode rectifier 85 having an anode 86, a control grid 87, a cathode 88 and a heater filament 89. Energizing current is supplied the heater filament 89 from the transformer secondary winding 20. The control grid 87 and anode 86 are directly connected to each other and to the terminal of resistance 47 which is remote from the grounded negative conductor 48. The cathode 88 is connected by the condenser 78 to the anode 54 of triode 53.

In this manner the alternating or fluctuating potential of the output circuit of preliminary stage 6 and appearing between the anode 54 of triode 53 and the grounded negative conductor 48 is rectified by the rectifier 85 to produce a unidirectional potential drop across the resistance 47 having a magnitude corresponding to the magnitude of the fluctuating potential of the output circuit of stage 6 and of a given polarity irrespective of the phase of that fluctuating potential. A condenser 90 is connected in parallel to the resistance 47 for the purpose of smoothing out the pulsations in the unidirectional potential drop produced across resistance 47. This unidirectional potential drop so established across resistance 47 is utilized in a manner explained in detail hereinafter to neutralize the hunting tendency of the system.

Anode voltage is supplied the output circuits of the triodes 68 and 69 from the transformer secondary winding 22. Thus, the anode circuit of triode 68 may be traced from the left end terminal of the winding 22 through a conductor 91, in which the operating winding 92 of relay 9 is inserted, to the anode 70, and cathode 72 to the tap 81 on the winding 22. The anode circuit of triode 69 may be traced from the right end terminal of the transformer secondary winding 22 through a conductor 93, in which the operating winding 94 of relay 8 is inserted to the anode 74, and cathode 76 to the tap 83 on winding 22.

Relay 8 controls the operation of a switch arm 95 into and out of engagement with a fixed contact 96. Switch arm 95 is biased by spring or other means away from contact 96. When switch arm 95 engages contact 96, an energizing circuit is completed for the field winding 13 of reversible motor 10. This circuit may be traced from the left end terminal of the transformer secondary winding 23 through a conductor 97 to the switch arm 95, contact 96, conductor 98, motor field winding 13, and a conductor 99 to the right end terminal of the winding 23.

Relay 9 controls the operation of a switch arm 100 into and out of engagement with a fixed contact 101. Switch arm 100 is biased by spring or other means away from contact 101. When switch arm 100 engages contact 101, an energizing circuit is completed for the field winding 14 of motor 10. This circuit may be traced from the left end terminal of transformer secondary winding 23 through conductor 97, switch arm 100, contact 101, conductor 102, motor field winding 14, and conductor 99 to the right end terminal of winding 23.

If desired, suitable limit switches may be connected in the energizing circuits for the motor field windings 13 and 14 to interrupt the energization of motor 10 for rotation when the latter has operated to the extreme limits of adjustment of the fuel valve 1. Such limit switches may be operated in any convenient manner by a suitable member connected to the shaft of motor 10.

When the bridge network 2 is balanced, the output terminals 28 and 29 are at the same potential, and therefore, no signal is applied to the input circuit of the amplifier. Accordingly, no signal is produced in the output circuit of the second preliminary stage 6 and no signal is applied to the input circuits of the output amplifier stage 7 of which triodes 68 and 69 comprise a part. Under this condition triodes 68 and 69 are equally conductive but due to the bias potential impressed on the input circuits thereof by the portion of transformer secondary winding 22 between the taps 80, 81 and 80, 83 the current flow through each of the relay operating windings 92 and 94 will be below the operating level of the relays 8 and 9 and both of the switch arms will then be held out of engagement with their associated contacts. Motor 10 is then deenergized, and therefore, the valve 1 is maintained in the position to which it has been previously adjusted.

Upon a decrease in the temperature of the room or space 4 in which the resistance 3 is positioned, an alternating potential of predetermined phase relatively to the alternating potential at the terminals of transformer secondary winding 22 and impressed on the anode circuits of triodes 68 and 69 appears between the output terminals 28 and 29 of the bridge network 1. This alternating potential at the terminals 28 and 29 of the bridge network is amplified by the preliminary amplifying stages 5 and 6 and is applied to the input circuits of the triodes 68 and 69 without any substantial shift in phase. Since this amplified potential is in phase with the terminal voltage of the transformer secondary winding 22, it is then in phase with the alternating potential applied from the portion of winding 22 to the right of tap 83 to the anode circuit of triode 69, and out of phase with the alternating potential applied from the portion of winding 22 to the left of tap 81 to the triode 68. As a result, the conductivity of triode 69 is increased to effect energization of relay 8 and operation of motor 10 in the direction to drive slide contact arm 30 to the left along slidewire resistance 31 to rebalance the bridge network 2, and simultaneously to increase the opening of valve 1 so that more heat is supplied to the room or space 4 to the temperature of which the resistance element 3 is subjected.

When a rise in temperature of resistance 3 takes place, the alternating potential appearing at the terminals 28 and 29 is of the opposite phase from the case previously considered, and consequently the conductivity of triode 68 is increased to cause operation of relay 9 and thereby energization of motor 10 for rotation in the direction to drive slide contact arm 30 to the right along slidewire resistance 31 to rebalance the bridge network 2, and to simultaneously adjust valve 1 toward its closed position, thereby reducing the supply of heat to the room or space 4.

If desired, the impedance of relay windings 92 and 94 may be so designed and the bias potentials on the input circuits of triodes 68 and 69 so chosen that both relays attract their contact arms when the bridge network is balanced. With such modification, the two motor field windings 13 and 14 are energized and oppose each other under balanced conditions, resulting in a normally stalled motor which provides a braking action and thus aids in preventing overrunning of the motor beyond the true position of balance of the slide contact arm 30 along slidewire resistance 31.

In order to positively ensure that the motor 10 will not overrun the true balance position of slide contact arm 30 along slidewire resistance 31 and thus establish an oscillating or hunting condition of the system, there is introduced into the input circuit of the preamplifying stage 5 a unidirectional potential of varying magnitude depending upon the magnitude of the unbalanced alternating potential which appears between the bridge network output terminals 28 and 29. This unidirectional potential is introduced in the input circuit of the pentode 40 in series with the unbalanced alternating potential established between the bridge terminals 28 and 29 and is derived from the output circuit of the preamplifying stage 6 by means of the rectifier triode 85, resistance 47 and condenser 90 in the manner previously explained herein. Specifically, the unidirectional potential referred to is that tapped off the slidewire resistance 47 between the lower end of resistance 47 and the slide contact 46.

The desired neutralization of the coasting and overrunning tendency of the system is accomplished by this unidirectional potential by virtue of the operation of the pentode 40 which, as previously noted, is a variable-mu pentode. The amplification factor of such electronic valves is a function of the negative bias potential applied to the control electrode, and in particular, decreases as the negative bias is increased. The cathode biasing resistance 49 and condenser 50 operate normally to maintain a predetermined negative bias on the control electrode of pentode 40, and accordingly, when no unidirectional potential appears across resistance 47 as is the case when the bridge network 2 is balanced, the amplification factor of pentode 40 is a predetermined value.

At this amplification factor the application of an alternating potential of given value on the input circuit of pentode 40 from the bridge output terminals 28 and 29 as a result of bridge unbalance produces an alternating potential of predetermined magnitude in the output circuit of the preamplifying stage 6. This amplified alternating potential is impressed on the input circuits of the amplifier output stage 7 and thus controls the selective actuation of one relay 8 or 9 and thereby operation of motor 10 for rotation in one direction or the other. The current flow established by this amplified alternating potential in the resistance 47 is simultaneously rectified by the rectifier triode 85 so that a unidirectional potential drop is produced across resistance 47 having a magnitude determined by the magnitude of the amplified alternating potential. The polarity of the unidirectional potential so established across resistance 47 remains the same irrespective of the phase of the alternating potential which creates it and is of the proper polarity to increase the negative bias impressed on the control electrode of pentode 40. Consequently, as a result of the application of an alternating potential on the input circuit of pentode 40 from the bridge circuit 2 the amplification of the pentode 40 is decreased and such decrease in amplification is effected regardless of the phase of the applied alternating potential and thereby regardless of the direction of bridge network unbalance.

It is noted that the use of condenser 90 for smoothing out the unidirectional potential drop produced across resistance 47 causes some delay in the production of a potential drop across resistance 47 following the appearance of an alternating potential in the output circuit of the preliminary amplifying stage 6. This delay has the effect of permitting the full action of the bridge unbalanced potential to be utilized initially to establish operation of the motor 10 for rotation in one direction or the other. It may be desirable in some cases for there to be such a time lag between the time that the bridge unbalanced potential is impressed on the input circuit of the pentode 40 and the time that the amplification changing bias is impressed on that input circuit.

With this arrangement, therefore, the amplification of the pentode 40 is a maximum when the bridge network 2 is first unbalanced so that the full unbalanced effect is initially utilized to operate the relay 8 and 9 and thereby motor 10. As soon as a unidirectional bias is established across resistance 47 and is impressed on the input circuit of pentode 40, however, the amplification of the pentode 40 is decreased by an amount corresponding to the magnitude of the bridge unbalanced potential within limits depending upon the overload characteristics of the preamplifier stages 5 and 6.

Such decrease in amplification of pentode 40 has the same effect on the alternating potential applied to the amplifier output stage 7 as a predetermined adjustment of slide contact arm 30 along slidewire resistance 31 toward the new position of balance, and as a consequence, the motor 10 is deenergized before the slide contact arm 30 has reached the new position of balance. This anticipating effect is accentuated due to the tendency of the condenser 90 to resist any change in potential drop thereacross and to maintain the potential thereacross even when the contact arm 30 approaches the balance point. That is to say, upon unbalance of the bridge network 2 and the establishment of a unidirectional potential drop of corresponding magnitude thereacross, the motor 10 will operate to adjust the slide contact arm 30 toward the new balanced position along slidewire resistance 31. As the slide contact arm 30 approaches the point of balance of the bridge network the alternating potential impressed on the input circuit of pentode 40 diminishes in value, but the unidirectional bias potential obtained from resistance 47 does not decrease in proportion due to the action of condenser 90 in tending to maintain the then existing potential. Consequently, a disproportionately large unidirectional bias potential is impressed on the input circuit of pentode 40 as the slide contact arm 30 nears the new balance point with the result that the motor 10 is deenergized before the balance point is reached.

By adjusting the magnitude of the unidirectional feed back bias potential to pentode 40 and by properly delaying the change of this potential in response to change in the state of balance of bridge network 2, the motor 10 may be deenergized for rotation at the proper moment before the balance point of bridge network 2 is approached as is required to exactly neutralize the tendency of the motor 10 and its associated drive mechanism to overrun or coast beyond the true balance point.

Figure 2:
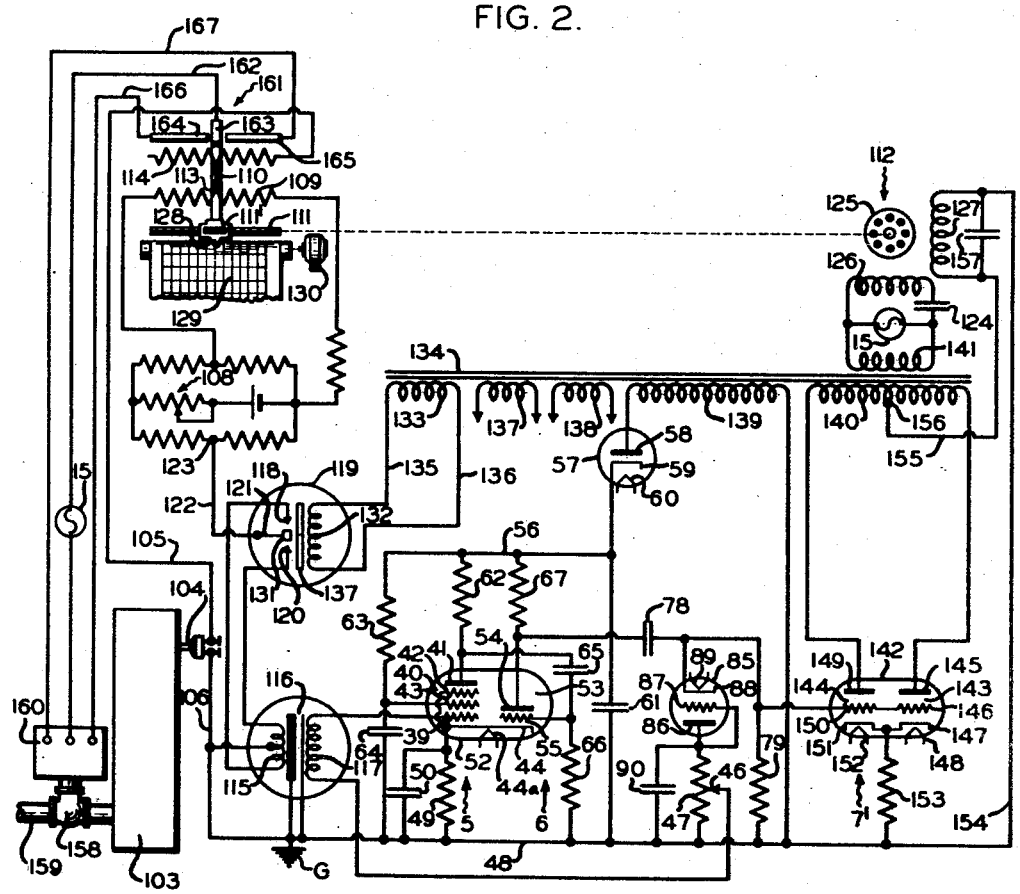
Fig. 2 illustrates the use of my invention in a potentiometric type temperature recording and controlling system.

In Fig. 2 I have illustrated, more or less diagrammatically, the adaptation of my invention to a potentiometric recording and controlling system. More specifically, an arrangement is illustrated in Fig. 2 for recording and controlling the temperature of a furnace 103 in the interior of which a thermocouple 104 is arranged which is responsive to slight changes in the temperature of the furnace. The thermocouple which may be located at a distance from the remainder of the potentiometric measuring circuit has its terminals connected by a pair of conductors 105 and 106 to the terminals of a potentiometric measuring circuit 108 which preferably is of the null type. The potentiometric circuit 108 includes a slidewire resistance 109 and an associated contact 110 which is adapted to be moved along the length of the slidewire 109. It will be understood that the potentiometric circuit 108 may be of any suitable type such as the Brown potentiometric type disclosed in Patent 2,150,502 issued to T. R. Harrison, E. H. Grauel and J. E. Kessler on March 14, 1939. The movable contact 110 is attached to a suitable carrier which may be in the form of an internally threaded nut 111' adapted to ride on a screw threaded rod 111 which is rotated in one direction or the other under control of the thermocouple 104. A suitable reversible electrical motor generally designated by the reference numeral 112 is mechanically coupled in any convenient manner to the screw threaded rod 111 to rotate the latter at the desired speed and in the desired direction to thereby move the contact 110 along slidewire resistance 109 to rebalance the potentiometric measuring circuit 108 whenever the latter is unbalanced.

The contact 110 is a bridging contact connecting the point 113 of the slidewire resistance 110 to a corresponding point of a slidewire resistance 114 which is arranged alongside the resistance 109. The resistance 114 has one end connected by the conductor 105 to one terminal of the thermocouple 104 and is employed for the purpose of avoiding measurement inaccuracies due to variations in resistance to the flow of current generated by the thermocouple 104 which would otherwise result from variations in the relative resistances of the portions of the resistance 109 at opposite sides of the point 113. The other terminal of the thermocouple 104 is connected by means of the conductor 106 to the center tap on the primary winding 115 of a transformer 116 having a secondary winding 117. One end terminal of the primary winding 115 is connected to a contact 118 of a current interrupting device designated generally at 119 and the other end terminal of the primary winding 115 is connected to a contact 120 of the device 119. The current interrupting device may be of the type disclosed in the copending F. W. Side application, Serial No. 421,176 filed December 1, 1941, which issued on July 8, 1947 as Patent No. 2,423,524, and includes a vibrating reed 121 and an operating winding 132 in addition to the contacts 120 and 118. The vibrating reed is positioned between the contacts 120 and 118 and is adapted to engage the latter contacts in alternation. The vibrating reed 121 is connected by a conductor 122 to the point 123 of the potentiometric measuring circuit 108.

The flow and direction of flow of current through the circuit branch from the point 123 of the potentiometric measuring circuit to the current interrupting device 119, the transformer 116, the thermocouple 104, and the bridging contact 110 to the point 113 depends upon the relation between the electromotive force produced by the thermocouple 104 and the potential difference between the potentiometric circuit points 113 and 123. The thermocouple 104 is so connected to the potentiometric circuit that the electromotive force of the thermocouple opposes the potential difference between the points 113 and 123. Movement of the contact 110 to the left and right operates to respectively decrease and increase the potential difference between the points 113 and 123. With suitable adjustments of the contact 110, the potential difference between the points 113 and 123 will be equal and opposite to the electromotive force produced by the thermocouple 104 and no current will flow through the above mentioned circuit branch including the device 119, transformer 116 and thermocouple 104. On an increase in the thermocouple electromotive force above the potential difference between the points 113 and 123 current will flow in one direction through the interrupter 119 and the transformer primary winding 115 and such current flow may be eliminated by a suitable adjustment of the contact 110 to the right. Conversely, when the electromotive force of the thermocouple falls below the potential difference between the potentiometric circuit points 113 and 123, the resultant current flow through the interrupting device 119 and the transformer primary 115 will be in such a direction as to be eliminated by a suitable adjustment of the contact 110 to the left.

The bridging contact 110 is adjusted along the slidewire resistances 109 and 114 by the operation of the reversible electrical motor 112 which has its rotor mechanically connected to the threaded shaft 111 on which the nut 111' which supports the bridging contact 110 is carried. The reversible electrical motor 112 has a pair of terminals which are connected to the output circuit of the amplifier output stage 7' and also has a pair of terminals which are connected to the alternating current supply source 15 through a suitable condenser 124.

For its intended use the motor 112 may be of the type diagrammatically shown in the drawing and comprising a rotor 125 and two pairs of oppositely disposed field poles (not shown) on one pair of which a winding 126 is wound and on the other pair of which a winding 127 is wound. Winding 126 is supplied with energizing current from the alternating current supply source 15 through condenser 124. Due to the action of condenser 124 the current which flows through the motor winding 126 will be in phase with the voltage of the alternating current supply source. The current supplied to the winding 127 of the motor 112 from the amplifier output stage 7' leads or lags by 90° the voltage of the alternating current supply source 15 and establishes a field in the rotor 125 which is displaced 90° in one direction or the other with respect to that established therein by the winding 126. Reaction between the field set up by the winding 126 with that set up by winding 127 establishes a rotating field in the rotor which rotates the latter in one direction or the other depending upon whether the winding 127 is energized with current which leads or lags by 90° the voltage of supply source 15 and thereby in accordance with the direction of potentiometric unbalance. The direction and duration of rotation of the motor 112 is controlled in accordance with the direction and extent of unbalance of the potentiometric measuring circuit 108 so that on rotation of motor 112 the bridging contact 110 is adjusted in the proper direction to rebalance the potentiometric circuit 108.

A pen 128 is mounted on the nut 111' which carries the bridging contact 110 and is arranged in cooperative relation with a recorder chart 129 to thereby provide a continuous record of the temperature to which the thermocouple 104 is subjected. The chart 129 may be a strip chart, as shown, and is adapted to be driven in any convenient manner, as for example, by a unidirectional electrical motor 130 through suitable gearing (not shown) so that a record of the temperature to which the thermocouple 104 is subjected will be recorded as a continuous line on the chart 129.

The current interrupting device 119 operates to convert the potentiometric unbalanced unidirectional currents into alternating currents in the transformer secondary winding 117 which are capable of being readily amplified and includes the vibrating reed 121 for operating a contact 131 with respect to the relatively fixed contacts 118 and 120. The vibrating reed 121 is vibrated under the influence of the winding 132 which has its terminals connected to the secondary winding 133 of a transformer 134 by conductors 135 and 136 and is supplied with alternating current therefrom. A permanent magnet 137 associated with the vibrating reed 121 is provided for polarizing and synchronizing purposes. The permanent magnet 137 and the operating winding 132 cooperate to vibrate the reed 121 at the same frequency as the frequency of the alternating voltage supplied by the transformer secondary winding 133. In consequence, the unbalanced potentiometric currents are caused to alternately flow through the opposite halves of the transformer primary winding 115 in such manner as to create an alternating potential in the transformer secondary winding 117 which is of the same frequency as the alternating voltage supplied by the transformer secondary winding 133 and is in phase with or displaced 180° in phase from the voltage of winding 133 depending upon the direction of potentiometric unbalance. This alternating voltage derived in the transformer secondary winding 117 is well adapted for amplification by the electronic amplifier to the input terminals of which the transformer secondary winding 117 is connected.

The electronic amplifier comprises two preliminary amplifying stages 5 and 6 and the output or motor driving stage 7', all of which stages receive energizing current from the transformer 134. It will be understood that additional preliminary amplifying stages may be provided, if desired. Transformer 134 includes secondary windings 137, 138, 139 and 140 in addition to the secondary winding 133 and also includes a primary winding 141 which has its terminals connected to the alternating current supply source 15. The alternating voltage created in the transformer secondary winding 117 is amplified through the action of the preliminary amplifying stages 5 and 6 and the amplification thus effected is utilized in controlling the motor driving stage 7' and thereby the energization of the phase winding 127 of the motor 112 to control the selective actuation of the latter for rotation of the rotor 125 in one direction or the other. Parts of the electronic amplifier which correspond exactly to parts of the electronic amplifier of Fig. 1 have been designated by the same reference numerals.

As shown, the preliminary amplifying stage 5 includes a variable-mu pentode 40 to the input circuit of which the terminals of the transformer secondary winding 117 are connected in series with the portion of resistance 47 tapped off by the contact 46. The output circuit of pentode 40 is supplied with unidirectional energizing potential from the positively energized conductor 56 and negatively energized conductor 48. A unidirectional potential is maintained between the conductors by means of a rectifier circuit including the transformer secondary winding 139 and the rectifier tube 57. A condenser 61 is connected between the conductors 56 and 48 for the purpose of smoothing out the ripple in the unidirectional potential maintained between conductors 56 and 48.

The output circuit of pentode 40 is coupled by means of condenser 65 and resistance 66 to the input circuit of the preliminary amplifying stage 6 which, as shown, includes the triode 53. Energizing potential is supplied the output circuit of triode 53 from the conductors 56 and 48. The output circuit of triode 53 is coupled by means of the condenser 78 to the resistance 47 through the triode rectifier 85 to establish a unidirectional potential across resistance 47 whenever an alternating or fluctuating potential appears in the output circuit of triode 53, and is also coupled by means of the condenser 78 to the input circuit of the motor driving stage 7'.

Motor driving stage 7' includes a tube 142 which contains two heater type triodes, designated by the reference characters 143 and 144, and within the same envelope. Both of the triodes 143 and 144 include anode, control electrode, cathode and heater filament elements which in triode 143 have been designated by numerals 145, 146, 147 and 148, respectively, and in the triode 144 have been designated by the numerals 149, 150, 151 and 152, respectively. The heater filaments 148 and 152 are connected in parallel and have their terminals connected to the terminals of the transformer secondary winding 137 which also supplies energizing current to the heater filament 44a of tube 52 and heater filament 89 of tube 85. Transformer secondary winding 138 is connected to and supplies energizing current to the heater filament 60 of rectifier tube 57.

The input circuits of triodes 143 and 144 are connected in parallel and may be traced from the control electrodes 146 and 150, which are connected together, through the resistance 79 to the negative conductor 48, and a cathode biasing resistance 153 to the cathodes 147 and 151 which also are connected together.

Anode voltage is supplied the output circuits of triodes 143 and 144 from the transformer secondary winding 140. The anode of the triode 143 is connected to the right end terminal of the winding 140 and the anode of the triode 144 is connected to the left end terminal of the winding 140. The cathodes of the triodes 143 and 144 are connected through the biasing resistance 153 and a conductor 154 to one terminal of the motor phase winding 127 and the other terminal of the latter is connected through a conductor 155 to a center tap 156 on the transformer secondary winding 140. Thus, the triodes 143 and 144 are utilized for supplying energizing current to the phase winding 127 of motor 112.

The motor 112 is preferably so constructed that the impedance of the winding 127 is of the proper value to match the impedance of the anode circuits of the triodes 143 and 144 when the motor is operating in order to obtain the most efficient operation. Preferably, the motor is so constructed that it has a high ratio of inductance to resistance, for example, of the order of 6-1 or 8-1 at the frequency of the energizing current supplied to it. This provides for maximum power during the running condition of the motor with the least amount of heating, and also provides a low impedance path for braking purposes.

As noted hereinbefore, energizing current is supplied to the motor winding 126 from the alternating current supply source 15 through the condenser 124. The condenser 124 is so selected with respect to the inductance of the motor winding 126 as to provide a series resonant circuit having a unity power factor. By virtue of the series resonant circuit, the total impedance of the motor winding 126 is substantially equal to the resistance of the winding, and since this resistance is relatively low, a large current flow through the winding 126 is made possible. This permits the attainment of maximum power and torque from the motor 112. Furthermore, the current flow through the motor winding 126 is in phase with the voltage of the alternating current supply source 15 because of the series resonant circuit. The voltage across the motor winding 126, however, leads the current by substantially 90° because of the inductance of the winding 126.

Energizing current is supplied the motor winding 127 from the transformer secondary winding 140 through the anode circuits of the triodes 143 and 144 through the circuits previously traced. A condenser 157 is connected in parallel with the motor winding 127 and is so chosen as to provide a parallel resonant circuit having a unity power factor. This parallel resonant circuit presents a relatively high external impedance and a relatively low local circuit impedance. The relatively high external impedance is approximately the same as the impedance of the anode circuits of the triodes 143 and 144, and accordingly, provides efficient operation. The relatively low internal circuit impedance approximates the actual resistance of the winding 127, and since this resistance is relatively low, the impedance of the local circuit is also relatively low.

For the first half cycle of the alternating voltage produced across the terminals of the transformer secondary winding 140, the anode of the triode 143 is rendered positive with respect to the center tap 156 while the anode of triode 144 is rendered negative with respect to said tap. During the second half cycle the anode of the triode 144 is rendered positive with respect to the tap and the anode of triode 143 is rendered negative with respect to said tap. Accordingly, the triodes 143 and 144 are arranged to conduct on alternate half cycles of the alternating current supplied by the supply source 15.

When no alternating signal is impressed upon the control grids 146 and 150 of the triodes 143 and 144, pulsating unidirectional current of twice the frequency of the alternating voltage supplied by source 15 is impressed on the motor winding 127. When thus energized, the motor 112 is not urged to rotation in either direction but remains stationary. Due to the relatively high direct current component of the current then flowing through the motor winding 127, the core structure of the motor 112 tends to become saturated whereby the inductive reactance of the motor winding 127 is relatively small. The condenser 157 in shunt to winding 127 is so chosen that the condenser and motor winding then provide a parallel resonant circuit. This saturation of the core structure of the motor 112 operates to exert an appreciable damping effect on the rotor 125, or in other words, an effect tending to prevent rotation of the rotor 125. Consequently, if the rotor 125 has been rotating, saturation of the motor core structure operates to quickly stop the rotation.

An additional effect also obtained is the introduction of a tremor into the mechanism connected to rotor 125, which tremor serves to keep that mechanism in a nascent state and thus overcomes any adverse effects which might otherwise be encountered due to static friction of said mechanism. This tremor results from the application of pulsating current of twice the frequency of supply source 15 on the motor winding 127 under the condition of motor operation under consideration. That is to say, alternate pulses of current through winding 127 tend to produce motor rotation in one direction and the remaining pulses of current tend to produce motor rotation in the opposite direction. Such operation imparts a tremor to the rotor 125.

When an alternating signal is impressed on the control grids 146 and 150, the magnitude of the pulses of current flowing in the anode circuit of one triode 143 or 144 will be increased while the magnitude of the pulses of current flowing in the anode circuit of the other triode will be decreased. Accordingly, the pulses of unidirectional current supplied to the motor winding 127 during the first half cycle will predominate over those supplied the motor winding during the second half cycle. Which anode current will be increased depends upon whether the alternating signal is in phase with or 180° out of phase with the voltage of source 15.

Such energization of the motor winding 127 operates to introduce therein an alternating component of current of the same frequency as that supplied by the alternating supply source 15. This alternating component of current will either lag by 90° or lead by 90° the alternating current flowing through the motor winding 126 depending upon which of the triodes 143 and 144 has its anode current increased by the prevailing alternating signal on the control grids, and with either phase relation the two currents produce a magnetic field in the motor core structure which rotates in one direction or the other, depending upon said current phase relation and effects rotation of the motor in the corresponding direction. Moreover, when the motor winding 127 is so energized, the direct current component of the current flowing therein is decreased, and consequently, the saturation of the motor core structure is decreased with the result that the rotor damping effect is reduced and the tremor referred to disappears.

This general arrangement for operating a reversible rotating field motor is disclosed and claimed in a copending application Serial No. 421,173 which was filed by Walter P. Wills on December 1, 1941 and which issued on July 8, 1947 as Patent No. 2,423,540.

The inherent damping characteristic of the motor 112 contributes appreciably toward the elimination of the coasting tendency of the motor while accomplishing the potentiometric rebalancing operations, and in combination with the feed back circuit including elements 46, 47 and 90 of my invention positively assures the attainment of this desired result while permitting the potentiometric rebalancing operations to be effected at extremely high speed.

With the modification of Fig. 2, similarly to the arrangement of Fig. 1, the amplification of the pentode 40 is a maximum when the potentiometric network 108 is balanced or is first unbalanced so that the full unbalanced effect is initially utilized to cause energization of the motor 112 for rotation in one direction or the other. Thereafter, when a unidirectional potential is produced across resistance 47 and is impressed on the input circuit of the pentode 40, the amplification of the pentode 40 is decreased by an amount corresponding to the magnitude of the potentiometric unbalanced potential. This decrease in amplification of pentode 40 has the same effect on the energizing current flow to the motor winding 127 as a predetermined adjustment of contact 110 toward the new position of balance and makes possible the phenomena of motor deenergization before the contact 110 has reached the true position of rebalance. Here also, as in the arrangement of Fig. 1, this anticipating action is accentuated due to the tendency of the condenser 90 to resist any change in potential between its terminals and to maintain a disproportionately large potential thereacross as the contact 110 approaches the new balance position. As a result, a disproportionately large unidirectional bias potential is impressed on the input circuit of pentode 40 as the contact 110 nears the new balance point to ensure that the motor 112 is deenergized for rotation the proper time before the balance point is reached as is required to compensate for the tendency of the motor 112 and its associated drive mechanism to overrun or coast beyond the true balance point.

As those skilled in the art will recognize, the reversible electrical motor 112 may be employed to operate a valve 158 positioned in a fuel supply pipe 159 for varying the supply of heating agent to the furnace 103 to the temperature of which the thermocouple 104 is responsive, or preferably, a separate reversible electrical motor may be so employed. For example, a reversible electrical motor 160 having two opposed field windings (not shown) may be used for this purpose. The reversible motor 160 is mechanically connected in any suitable manner to the valve 158 and is adapted to adjust the latter to its opened and closed positions depending upon the direction to which the motor 160 is energized for rotation. The mechanical connection of the motor 160 to the valve 158 is such as to increase and decrease the supply of heating agent to the furnace as the temperature of the latter falls below and rises above a predetermined level.

The motor is energized for rotation in one direction or the other, depending upon which of the two opposed field windings is energized, by means of a switch 161. As shown, current flows from the alternating current supply source 15 through a conductor 162 to a switch arm 163 which is insulated from but is carried by the nut 111' which carries the potentiometer slidewire contact 110, thence by either of the two opposed contacts 164 or 165, conductors 166 or 167 and one field winding or the other field winding of the motor 160 to the other terminal of the supply source 15. Although not shown, the contacts 164 and 165 of the switch 161 are made adjustable so that both the control point setting and sensitivity of the apparatus may be set in a manner well known in the art.

It will be understood that, if desired, the motor drive arrangement and control system of Fig. 2 may be employed in lieu of the relay drive system of Fig. 1 for effecting the desired adjustments in position of fuel valve 1 in response to changes in the temperature adjacent the resistance thermometer 3.

Figure 3:
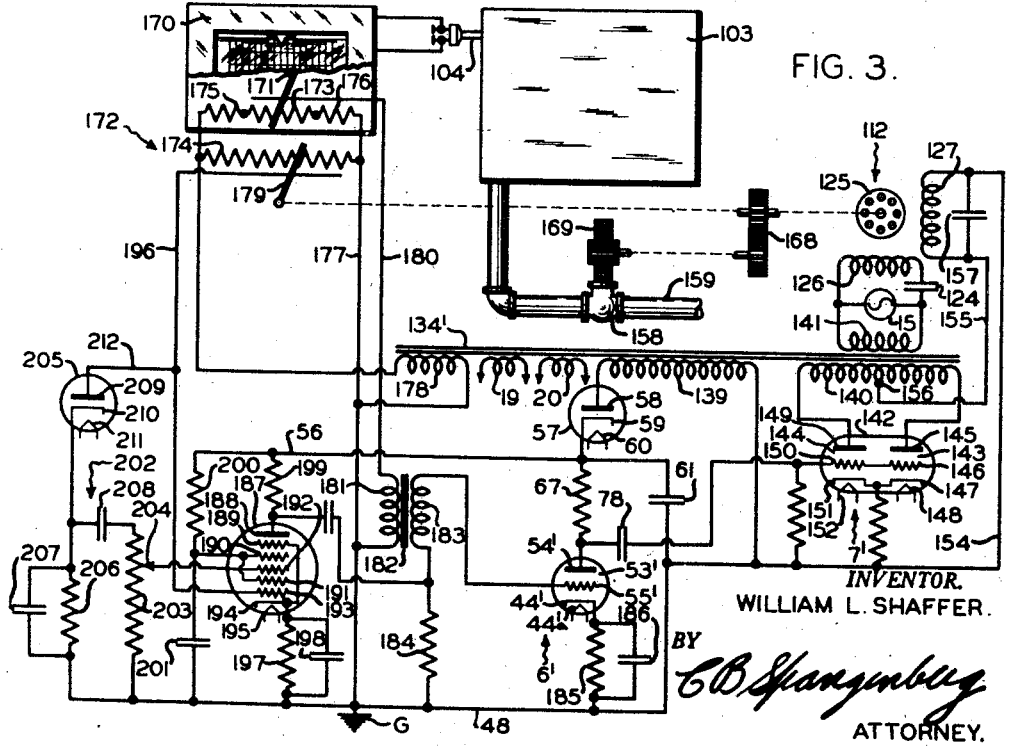
Fig. 3 illustrates the use of still another embodiment of my invention.

In Fig. 3 I have illustrated, more or less diagrammatically, another embodiment of my invention in which the adjustments of fuel valve 158 are effected by reversible electrical motor 112 through the medium of suitable gear mechanism 168 and a rack 169. Fig. 3 also illustrates an alternative arrangement for neutralizing the tendency of the motor 112 and its associated mechanism to coast beyond the new balanced position of the system.

Specifically, there is illustrated in Fig. 3 a temperature control system comprising a furnace 103 which is supplied with fuel through a pipe 159. Valve 158 is provided in the pipe 159 for controlling the flow of fuel to the furnace. The temperature of furnace 103 in this modification is indicated by a pyrometer 170 which may be of any suitable type for indicating the electromotive force developed by the thermocouple 104. For example, the pyrometer 170 may take the form of the "mechanical" or "continuous balance" type potentiometer control instruments manufactured and sold commercially by The Brown Instrument Company, the assignee of the present invention. The Brown "mechanical" type potentiometer control instrument is generally disclosed in Patent 1,898,124 which was issued on February 21, 1933, to Thomas R. Harrison while the Brown "continuous balance" potentiometer control instrument is disclosed in the aforementioned Wills Patent 2,423,540.

Regardless of the type of potentiometer control instrument 170 employed, however, the operation of the motor 112 is controlled in accordance with the indication of the pyrometer to control the opening of the valve 158 as is required to maintain the temperature of the furnace 103 at the desired value. To this end, provisions are made for causing the opening of the valve 158 to be proportional to the displacement of the movable element 171 of the pyrometer 170.

The movements of the movable element 171 are transmitted to the fuel valve 158 by an arrangement including an electrical control network 172.

The control network 172 comprises an alternating current potentiometer and includes two branches. A slidewire resistance 173 is connected in one of the branches and a slidewire resistance 174 is connected in the other of the branches. Resistances 175 and 176 are also connected in the first mentioned branch, being disposed on opposite sides of resistance 173. The right end terminals of the two branches are connected by a conductor 177 to ground indicated at G. Alternating energizing current is supplied the control network 172 from the secondary winding 178 of a transformer 134' having a primary winding 141 connected to the alternating current supply source 15.

In accordance with this embodiment of my invention the magnitude of the alternating potential produced between ground G and the slide contact arm 171 is compared to the magnitude of the alternating potential produced between ground and the slide contact arm 179. The slide contact arm 171 is disposed in engagement with the slidewire resistance 173 and the slide contact arm 179 is disposed in engagement with the slidewire resistance 174. When the potential of the slide contact arm 171 is exactly the same as that of the contact 179, the control network 172 is in a balanced condition and the reversible motor 112 will then be at rest. Upon change in the position of contact 171 along resistance 173, however, the potential between contact 171 and ground will be rendered different from that between contact 179 and ground. This difference in potential is detected by an electronic amplifier arrangement to be described and is employed to control the selective actuation of motor 112 for rotation in the proper direction to cause such adjustment of the contact 179 as is required to equalize the two potentials.

The electronic amplifier referred to includes provisions which are different from those provided in the Figs. 1 and 2 forms of my invention for anticipating the adjustment of the contact 179 to its new balance position to thereby positively insure exact neutralization of the coasting tendency of the motor and the mechanism driven thereby. As is pointed out in detail hereinafter, the anti-hunting provisions of Fig. 3 are capable of operating in such manner as to cause momentary energization of the motor 112 for rotation in the reverse direction when the contact 179 approaches closely to its new balance position to thereby quickly and positively bring the motor to a stop with the contact 179 exactly at the new balance point. By means of this novel arrangement the motor 112 may be very fast in its rebalancing operation of the control network 172 without overshooting and consequent hunting occurring.

Specifically, the alternating potential established between the contact 171 and ground G is impressed by conductors 177 and 180 on the primary winding 181 of a transformer 182 having a secondary winding 183. The transformer secondary winding 183 is connected to the input circuit of a preliminary amplifying stage 6'. Amplifying stage 6' in Fig. 3 is comprised of a triode 53' having an anode 54', a control grid 55', a cathode 44' and a heater filament 44'a. Heater filament 44'a is connected to and receives energizing current from the transformer secondary winding 19.

The input circuit of triode 53' may be traced from the control electrode 55' to one end terminal of the transformer secondary winding 183, through the latter, a resistance 184 to the grounded conductor 48, and a biasing resistance 185 which is shunted by a condenser 186 to the cathode 44'. An alternating potential is established across the resistance 184 in opposition to the alternating potential induced in the transformer secondary winding 183 by means including an electronic valve 187, the latter of which in turn is controlled in accordance with the position of the contact 179 along the slidewire resistance 174. Thus, the resultant of the alternating potential induced in the transformer secondary winding 183 and the alternating potential produced across the resistance 184 is impressed on the input circuit of the triode 53'. When the contact 179 is at rest and the potential thereof is exactly the same as the potential of the contact 171, the alternating potential induced in transformer secondary winding 183 is exactly equal to and 180° out of phase with the alternating potential produced across resistance 184. Consequently, the resultant alternating potential impressed on the input circuit of the triode 53' will be zero in value when the control network 172 is in a balanced condition.

When the alternating potential induced in the transformer secondary winding 183 is changed in response to a change in position of contact 171 along the slidewire resistance 173, the alternating potential produced across the resistance 184 is changed a corresponding amount in the corresponding direction in response to adjustment of the contact 179 along resistance 174 by the motor 112. The change in potential across resistance 184, moreover, is effected in such manner as to anticipate the approach of the contact 179 to the new balance position so as to compensate for the tendency of the motor 112 and the mechanism driven thereby to coast beyond that balance position.

The output circuit of the triode 53' is coupled by means of a condenser 78 to the input circuit of a motor driving stage 7' and operates to control the latter as in the arrangement of Fig. 2 to selectively cause energization of the motor 112 for rotation in one direction or the other depending upon the phase of the alternating current output of the triode 53'.

The manner in which an alternating potential is established across the resistance 184 under control of the contact 179 and in opposition to that induced in the transformer secondary winding 183 will now be described. This result is accomplished by impressing the potential produced across slidewire resistance 174 between ground G and the contact 179 on one of the input circuits of the electronic valve 187 and by impressing a unidirectional potential on another of the input circuits of the valve 187 so as to control the amplification or gain of the latter in accordance with the motion and direction of motion of the contact 179 along the slidewire resistance 174.

The electronic valve 187 may be a pentagrid converter type and by way of example may be of the type known and sold commercially as the 6L7. Valve 187 includes an anode 188, suppressor grid 189, two screen grids 190 and 191 which as shown are tied together, a first control grid 192, a second control grid 193, a cathode 194 and a heater filament 195. The heater filament 195 is connected to and receives energizing current from the transformer secondary winding 19.

The first mentioned input circuit of valve 187, namely that on which an alternating potential is impressed, may be traced from the control grid 193 through a conductor 196 to the contact 179, the slidewire resistance 174 to the conductor 177, the grounded conductor 48 and a biasing resistance 197 shunted by a condenser 198 to the cathode 194.

Direct current energizing voltage is supplied the output circuit of the valve 187 from the positive conductor 56 through a circuit which may be traced from the conductor 56 through a load resistance 199, the anode 188, the cathode 194 and the parallel connected resistance 197 and condenser 198 to the grounded and negative conductor 48. Direct current energizing voltage is maintained between the conductors 56 and 48 by means of a transformer secondary winding 139, rectifier valve 57 and condenser 61 as in the arrangement of Fig. 2. Screen voltage is also obtained for the valve 187 from the conductors 56 and 48 through a circuit which may be traced from the conductor 56 through a resistance 200 to the screen grids 190 and 191 and from the latter grids through a condenser 201 to the grounded conductor 48. The suppressor grid 189 is internally connected to the cathode 194.

The cathode biasing resistance 197 and condenser 198 are so chosen that when the first mentioned control grid 192 is at the potential of the grounded conductor 48, the amplification factor of the valve 187 is such as to establish an alternating potential drop across resistance 184 which is exactly equal to the alternating potential induced in the transformer secondary winding 183 when the control network 172 is balanced. Thus, the amplification factor, and therefore, the gain of valve 187 is the proper value when no direct current bias potential is impressed on the control grid 192 to cause the resultant of the two alternating potentials in the input circuit of the triode 53' to be zero.

The amplification factor or gain of the valve 187 is adapted to be controlled in accordance with the motion and direction of motion of the contact 179 along the slidewire resistance 174, however, and an electrical network 202 is provided for establishing a unidirectional potential drop across a resistance 203 in accordance with the direction and extent of motion of the contact 179 along slidewire resistance 174. The resistance 203 is connected in the circuit which may be traced from the control grid 192, a contact 204 disposed in engagement with the resistance 203, through the latter to the grounded conductor 48, and the parallel resistance 197 and condenser 198 to the cathode 194.

The control network 202 for so establishing a unidirectional potential drop across resistance 203 includes a half wave rectifier 205, a resistance 206 which is shunted by a condenser 207 and both of the latter of which are shunted by the resistance 203 in series with a condenser 208. The half wave rectifier 205 includes an anode 209, a cathode 210 and a heater filament 211 which is connected to and receives energizing current from the transformer secondary winding 19.

The rectifier 205 is connected in a circuit which may be traced from the contact 179 through conductor 196 to a conductor 212, the anode 209 of rectifier 205, the cathode 210, the parallel connected resistance 206 and condenser 207 to the grounded conductor 48 and through the conductor 177 to the right end terminal of the resistance 174. The rectifier 205, therefore, operates to establish a unidirectional potential drop across the resistance 206 and condenser 207 which varies in magnitude in accordance with the position of the contact 179 along the slidewire resistance 174. This potential drop across resistance 206 and condenser 207 is impressed on the circuit including condenser 208 and resistance 203 and thus the condenser 208 is normally charged to the potential drop existing across the resistance 206. In such case, no current will flow through the resistance 203, and therefore, the potential drop across that resistance will be zero. Upon motion of the contact 179 to the left along resistance 174 as seen in the drawing, however, the alternating potential impressed on the network 202 will be increased to thereby cause an increase in the unidirectional potential drop established across the resistance 206 and condenser 207. This increase in potential drop across the latter elements will operate to cause a charging current to flow into the condenser 208 and through the resistance 203 to thereby produce a potential drop across the latter of the polarity to render the upper terminal positive with respect to the lower and grounded terminal. Conversely, upon motion of the contact 179 to the right along resistance 174 the alternating potential impressed on the network 202 will be decreased whereupon the potential drop established across the elements 206 and 207 will be decreased a corresponding amount. In this case, the potential drop on the condenser 208 will be greater than that across the elements 206 and 207 and therefore, the condenser 208 will discharge through the elements 206 and 207 and through the resistance 203 to produce a potential drop across the resistance 203 of the polarity rendering the lower and grounded terminal positive with respect to the upper terminal.

Thus, upon motion of the contact 179 to the left the direct current potential of the control grid 192 is rendered less negative to increase the amplification factor or gain of the valve 187, and upon motion of the contact 179 to the right, the direct current potential of the control grid 192 is rendered more negative to decrease the amplification factor or gain of the valve 187. This increase or decrease in the gain of valve 187 operates to cause a corresponding increase or decrease in the alternating potential produced across the resistance 184 with the contact 179 at a given position along the length of the slidewire resistance 174, and has the same effect on the input circuit of the triode 53' as a predetermined adjustment of the contact 179 along the slidewire resistance 174 in the direction required to rebalance the control network 172.

In this manner, the resultant of the opposed potentials established across the elements 183 and 184 may be reduced to zero before the contact 179 has been adjusted to the exact balance point. This anticipating effect, accordingly, may be utilized to cause deenergization of the motor 112 for rotation before the contact 179 has reached the new balance point, and as those skilled in the art will recognize, may be employed to create a resultant potential of the opposite polarity in the input circuit of the triode 53' to cause momentary energization of the motor 112 for rotation in the reverse direction to thereby quickly stop the latter. This additional effect is obtained by virtue of the tendency of the condensers 207 and 208 of the network 202 to resist any change in potential drop thereacross upon change in the position of the contact 179 along the slidewire resistance 174. Therefore, as the contact 179 approaches the new balance position, the direct current potential produced across the resistance 203 will lag slightly behind the position of the contact 179 and, consequently, the gain of the valve 187 will be changed a disproportionately large amount relatively to the displacement of the contact 179 from the new balance point to thereby cause the alternating potential produced across resistance 184 to be changed sufficiently to effect a reversal in the resultant of the potential drops across resistance 184 and transformer secondary winding 183. As those skilled in the art will further recognize the change in amplification factor or gain of the valve 187 which is produced upon motion of the contact 179 along the slidewire resistance 174 is proportional to the rate of adjustment of the contact 179. That is to say, the magnitude of the charging or discharging current flow through the resistance 203 is proportional to the rate of adjustment to the contact 179 along resistance 174, and therefore, the magnitude of the potential drop across resistance 203 varies in correspondence with the rate of adjustment of the contact 179. Accordingly, the anti-hunting effect which is obtained varies in accordance with the rate of rebalance of the control network 172 and operates to permit the rebalancing operation of the motor 112 to be effected at exceedingly high speed without any overshooting of the balance point occurring.

While in accordance with the provisions of the statutes, I have illustrated and described the best forms of embodiment of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use to other features.

Having now described my invention, what I claim as new and desire to secure by Letters Patent is:

1. Control apparatus for positioning objects including means for producing an electric signal, an object positioning reversible electric motor, and an electronic amplifier for controlling the direction of rotation of said motor in accordance with a characteristic of said signal, said amplifier including a variable-mu tube and means for varying the amplification factor of said tube in accordance with the movement of said motor to minimize the hunting tendency of said motor.

2. Control apparatus for positioning objects including means for producing an alternating voltage, an object positioning reversible electric motor, and an electronic amplifier for controlling said motor as to torque and direction of rotation according to the character of said voltage, said amplifier including a variable-mu tube and means for varying the amplification factor of said tube in accordance with the movement of said motor to minimize the hunting tendency of said motor.

3. Control apparatus for positioning objects including means for producing an alternating voltage, an object positioning reversible electric motor, and an electronic amplifier for controlling said motor as to torque and direction of rotation in accordance with the extent and direction of departure of said voltage from a predetermined value, said amplifier including a variable-mu tube and delayed action means for varying the amplification factor of said tube in accordance with the movement of said motor to minimize the hunting tendency of said motor.

4. Control apparatus for positioning objects including means for producing an electric signal, an object positioning reversible electric motor, electronic circuit means having an input circuit and an output circuit for controlling the direction of rotation of said motor in accordance with a characteristic of said signal, means to impress said signal on the input circuit of said electronic circuit means, and means including a variable-mu tube and means for varying the amplification factor of said tube in accordance with the operation of said motor to establish a second signal in the input circuit of said electronic circuit means in opposition to said first mentioned signal to minimize the hunting tendency of said motor.

5. Control apparatus for positioning objects including means for producing an alternating voltage, an object positioning reversible electric motor, electronic circuit means having an input circuit and an output circuit for controlling the direction of rotation of said motor in accordance with a characteristic of said signal, means to impress said voltage on the input circuit of said electronic circuit means, and means including a variable-mu tube and delayed action means for varying the amplification factor of said tube in accordance with the operation of said motor to produce and superimpose a second alternating voltage on the input circuit of said electronic circuit means in opposition to said first mentioned voltage to minimize the hunting tendency of said motor, said delayed action means including electrical reactive means.

6. Control apparatus for positioning objects including a normally stabilized electrical network having a control slidewire resistance and slide contact and a follow-up slidewire resistance and slide contact, means to adjust said control slide contact along said control slidewire resistance according to the object positioning desired, means to derive an alternating voltage from said network of magnitude determined by the position of said control slide contact along said control slidewire resistance, an object positioning reversible electrical motor means having an operative connection to said follow-up slidewire resistance and slide contact to relatively adjust the latter, means to derive a second alternating voltage from said network determined by the position of said follow-up slide contact along said follow-up slidewire resistance, electronic circuit means to regulate the operate of said reversible motor means, said electronic circuit means including electronic valve means having input terminals and output terminals, means to impress said first mentioned alternating voltage on said input terminals, means to impress an alternating voltage on said input terminals in opposition to said first mentioned alternating voltage as required to minimize hunting of said reversible motor means including a variable-mu electronic valve having output terminals which are coupled to the input terminals of said electronic valve means and also having input terminals, means to impress said second mentioned derived alternating voltage on the input circuit of said variable-mu electronic valve, means to impress a unidirectional potential on the input terminals of said variable-mu electronic valve to vary the gain of the latter during operation of said motor including means to rectify said second mentioned derived alternating potential to produce a unidirectional potential varying in accordance with the magnitude of said second mentioned derived alternating potential, a reactance, a connection including said unidirectional potential, said reactance and the input terminals of said variable-mu electronic valve in series, and means coupled to the output terminals of said electronic valve means to energize said reversible motor means for rotation in one direction or the other when the opposed alternating potentials impressed on the input terminals of said electronic valve means are unequal.

WILLIAM L. SHAFFER.

REFERENCES CITED

The following references are of record in the file of this patent:

UNITED STATES PATENTS

| Number | Name | Date |
|---|---|---|
| 2,040,014 | Moseley | May 5, 1936 |
| 2,008,505 | Jobst | July 16, 1935 |
| 1,998,091 | McNally | Apr. 16, 1935 |